United States Patent
Chan et al.

(10) Patent No.: US 9,620,830 B2
(45) Date of Patent: Apr. 11, 2017

(54) VEHICLE BATTERY MODULE WITH COOLING AND SAFETY FEATURES

(71) Applicant: XINEN TECHNOLOGY HONG KONG COMPANY, LTD., Hong Kong (CN)

(72) Inventors: John R. Chan, Fremont, CA (US); Vinod K. Rao, Fremont, CA (US)

(73) Assignee: XINEN TECHNOLOGY HONG KONG COMPANY, LTD., Hong Kong (HK)

( * ) Notice: Subject to any disclaimer, the term of this patent is extended or adjusted under 35 U.S.C. 154(b) by 0 days.

(21) Appl. No.: 14/795,411

(22) Filed: Jul. 9, 2015

(65) Prior Publication Data

US 2016/0172727 A1 Jun. 16, 2016

Related U.S. Application Data

(60) Provisional application No. 62/124,408, filed on Dec. 16, 2014.

(51) Int. Cl.
| | | |
|---|---|---|
| *H01M 10/60* | (2014.01) | |
| *H01M 10/6557* | (2014.01) | |
| *H01M 10/613* | (2014.01) | |
| *H01M 10/625* | (2014.01) | |
| *H01M 10/643* | (2014.01) | |
| *H01M 2/10* | (2006.01) | |

(52) U.S. Cl.
CPC ..... *H01M 10/6557* (2015.04); *H01M 2/1077* (2013.01); *H01M 10/613* (2015.04); *H01M 10/625* (2015.04); *H01M 10/643* (2015.04); *H01M 2200/00* (2013.01); *H01M 2220/20* (2013.01)

(58) Field of Classification Search
CPC ........... H01M 10/6557; H01M 10/613; H01M 10/625; H01M 10/643; H01M 2220/20; H01M 2220/00; H01M 2/1077
See application file for complete search history.

(56) References Cited

U.S. PATENT DOCUMENTS

| | | |
|---|---|---|
| 8,309,240 B1 | 11/2012 | Li et al. |
| 2004/0012159 A1 | 1/2004 | Senda et al. |
| 2008/0003491 A1 | 1/2008 | Yahnker et al. |

(Continued)

FOREIGN PATENT DOCUMENTS

WO   WO2013/131588   * 9/2013

OTHER PUBLICATIONS

International Search Report and Written Opinion mailed Oct. 23, 2015, for International Application No. PCT/US2015/041364, 10 pages.

*Primary Examiner* — Stephen Yanchuk
(74) *Attorney, Agent, or Firm* — Perkins Coie LLP

(57) ABSTRACT

A battery pack apparatus is disclosed that reduces the possibility of thermal runaway by improving the transfer of heat from the battery body and apparatus to the coolant by increasing the surface area of contact between the two. Principles of shape charge are used to drive debris, splinters and other particles towards the ground in an automobile in the event of an explosion, thereby reducing the possibility of harm to the driver, occupants and automobile. Fire retardant cartridges are suitably embedded to deter fire and incidental harm to person and automobile.

5 Claims, 15 Drawing Sheets

(56) References Cited

U.S. PATENT DOCUMENTS

| | | | |
|---|---|---|---|
| 2009/0220850 A1 | 9/2009 | Bitsche et al. | |
| 2010/0116570 A1* | 5/2010 | Sugawara | B60K 1/04 180/65.1 |
| 2010/0270976 A1* | 10/2010 | Tamura | B60L 11/14 320/136 |
| 2010/0273034 A1 | 10/2010 | Hermann et al. | |
| 2011/0097617 A1* | 4/2011 | Gu | H01M 2/1077 429/120 |
| 2013/0183566 A1* | 7/2013 | Wayne | H01M 2/105 429/120 |

* cited by examiner

VEHICLE BATTERY MODULE WITH COOLING AND SAFETY FEATURES

This application claims the benefit of U.S. provisional patent application No. 62/124,408, filed on Dec. 16, 2014 and entitled, "Battery Module with Built-in Safety Features in the Event of Thermal Runaway," of J. Chan et al., which is incorporated herein by reference in its entirety.

FIELD OF THE INVENTION

The present invention relates generally to an automobile battery pack apparatus and, in particular, to a method and apparatus to make such a battery pack assembly more resistant to thermal runaway and to reduce potential harm to persons in case an accident does occur

BACKGROUND OF THE INVENTION

While the preferred fuel and engine for an automobile traditionally have been gasoline and an internal combustion engine, respectively, newer cars are providing the ability to run their engines on electricity with power achieved from a battery pack assembly placed within the car. Electric automobiles are less prone to noise and are not as polluting to air as are their gasoline-based counterpart cars.

An important distinguishing aspect of electric cars is their battery pack apparatus. Critical design parameters include the cost of the battery per kilo watt hour (KWH), the number of miles the car can be driven without a recharge, the safety of the driver from battery thermal runaway or explosion, and the cost and efficiency of the cooling systems for the battery pack. The cooling system efficiency also affects the cost per KWH, since the higher the operating temperature rises due to inefficient cooling, the more design cost and effort is incurred to make car components resistant and reliable to heat and rising temperatures as well as battery cell life.

Traditionally, a battery module for an electric car had battery cells arranged in rows, and had a straight (linear) coolant pipe placed against each row of battery cells. The battery cells generally are cylindrical, so that they have circular cross-sections. Consequently, the area of contact between the coolant pipe and each battery cell was very small, approximating that of a point (i.e., the point at which a circle touches a line tangential to the circle), thereby restricting the conduction of heat from the battery cell to the coolant. That design subsequently was improved slightly, by making the coolant pipes locally curvilinear at each cell, to better match the contours of the battery cells. This increased the contact area and hence increased heat conduction from the battery cell to the coolant pipe. However, the angle of contact between the pipe and each cell still remained only on the order of about 15 degrees, so that heat conduction from the battery cell to the coolant pipe was still restrictive. Furthermore, the coolant at the end of the pipe is at a higher temperature at the entrance of the pipe, resulting in a temperature difference between the first and last battery cell.

Due to poor heat conduction, battery cells have been vulnerable to increase in temperature resulting in fire or explosion. Additionally, accidental collision cannot be ruled out even in the most conservative and advanced electric cars, putting the electric car and occupants at risk from fire or explosion of the battery pack due to collision. The energy density of battery cells is expected to double every few years, with 10 times current energy density being developed in university laboratories. The higher the energy density is, the more critical is the cooling system to control the temperature of the battery cells for both vehicle safety and longevity of the battery cells.

DETAILED DESCRIPTIONS OF THE INVENTION

Introduced here are a battery module a vehicle and a system, apparatus and method of assembling such a battery module, which has more efficient cooling characteristics than prior vehicle battery modules and thereby reduces the likelihood of fire or explosion. More specifically, the technique introduced here improves the thermal performance of a battery pack by increasing the surface area of contact between each battery cell and the coolant. The battery module further has a design that mitigates damage to the vehicle and occupants in the event fire or explosion does occur. In certain embodiments, the battery module design mitigates damage by having a bottom side that will tend to fail in an explosion in preference to (instead of) the top side, so that missiles of particles, splinters and heat are directed away from the vehicle's occupants, cabin and chassis. Note that while the technique introduced here is primarily targeted towards automobile applications, it is not limited to automobiles and can potentially be implemented in other types of vehicles and applications, including motorcycles, scooters, aircraft, etc.

Figure 1:
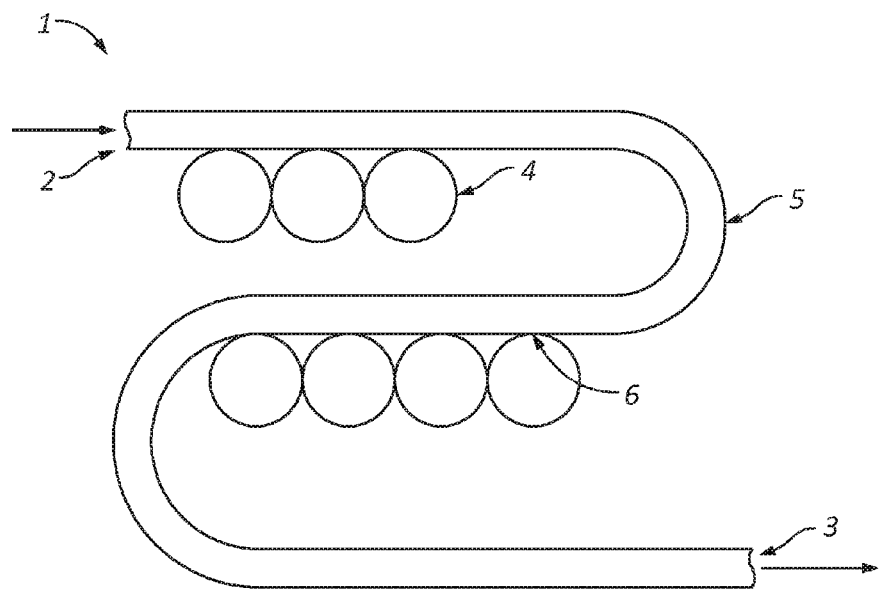
FIG. 1 shows an embodiment of a battery module apparatus with a line contact with cooling apparatus, in which the coolant runs in a generally straight pipe when in contact with the battery apparatus.

FIG. 1 schematically illustrates a traditional cooling mechanism employed in a battery module of a vehicle battery pack. A coolant fluid flows through the assembly by entering coolant pipe 5 at inlet 2 and exiting the pipe 5 at outlet 3. Most of the pipe 5 through which the coolant flows is straight; it curves only to reduce the effective length, and only at locations that are not in contact with any battery cells 4. Various battery cells 4 shielded with metal shield and insulation are in linear contact 6 with the coolant pipe. Due to the very limited area of contact between the coolant pipe 5 and battery cells 6, the amount of conduction of heat and discharge of the same to the ambient is limited.

Figure 2:
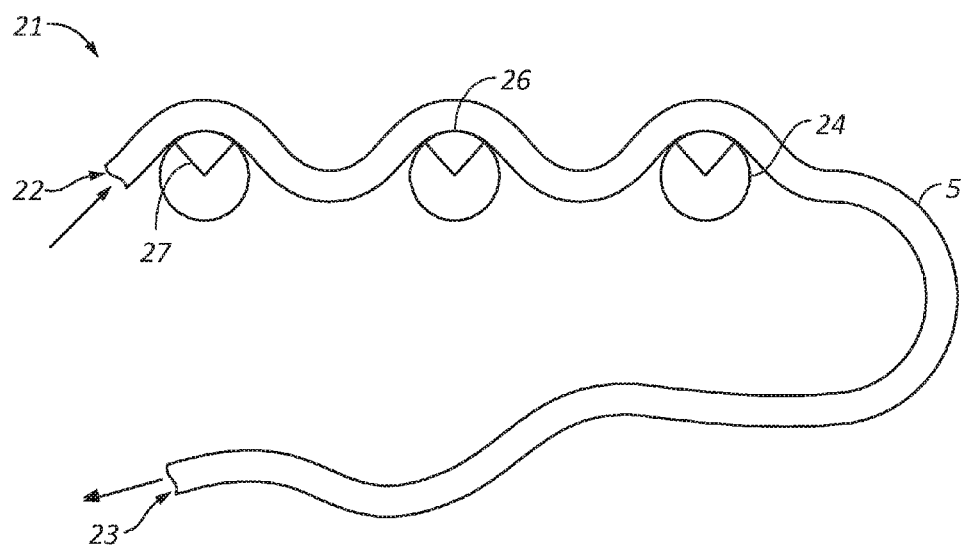
FIG. 2 shows an embodiment of a battery module apparatus with an angular contact point with a cooling apparatus to improve conduction of heat from the apparatus to ambient, in which the angular contact point is achieved by bending the coolant pipes along the curves of the battery apparatus.

FIG. 2 illustrates an enhanced version of the traditional cooling mechanism of FIG. 1. A coolant flows through the coolant pipe 25 by entering inlet 22 and exiting the pipe 25 at outlet 23. Battery cells 24 with metal shield and insulation touch the pipe 25 at curved regions 26 to increase the surface area of contact between battery cells 24 and the coolant. The surface area of contact can be measured by an angle 27. The angle 27 is typically only 15 degrees, but the design is an improvement over the design of FIG. 1.

Figure 3:
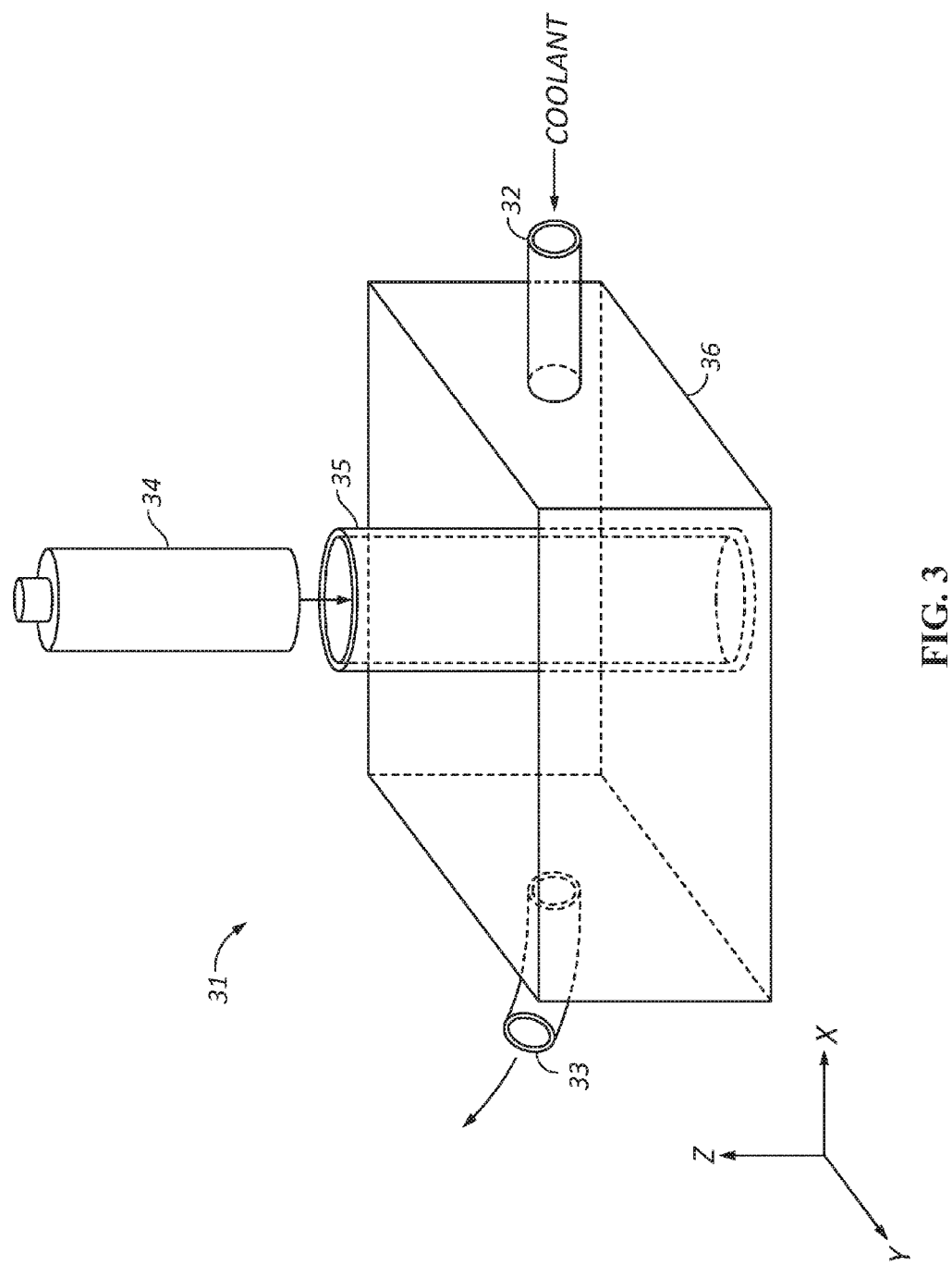
FIG. 3 shows a tank approach to a battery module, in which battery cells are immersed in a coolant filled tank.

FIG. 3 illustrates, in accordance with the techniques introduced here, an approach to a battery module design that improves upon the designs of FIGS. 1 and 2. In the battery module 31, instead of the coolant flowing through a pipe, the coolant is contained in a tank 36 that has an inflow 32 and an outflow 33. Instead of each battery cell's shield touching a coolant pipe only at a point or at small curved region, in this approach each battery cell 34, within a metal battery shield (also called "shell") 35, is immersed in coolant collected within a tank 36. Each battery cell 34 can be cylindrical, for example. In other embodiments, a battery cell 34 can be rectangular in cross-section or some other shape. The coolant completely surrounds each cell 34 in the x-y plane (or more precisely, completely surrounds the shield 35), along at least a portion of the cell's length in the cell's long axis, i.e., the z axis. In some embodiments, the coolant completely surrounds the battery cell 34 in the x-y plane along substantially the entire length of the battery cell in the z axis; only the terminal ends of each cell 41 a small portion of the cell adjacent to each terminal end remains exposed to air. Hence, due to immersion in a tank of flowing coolant, the surface area of contact for conduction is increased many times over that of the traditional designs described above. The tank structure also yields other advantages, as discussed below.

Figure 4A:
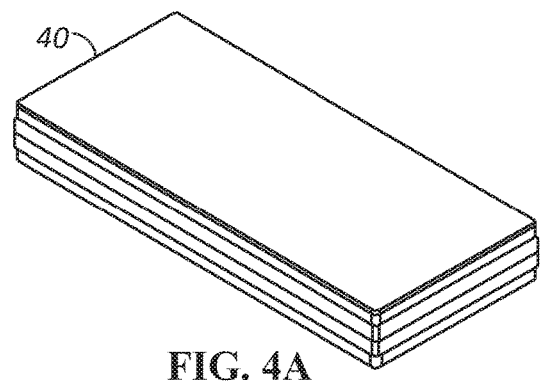
FIG. 4A shows an embodiment of a battery module apparatus with a tank of coolant and a plurality of immersed battery rods, in accordance with the approach shown in FIG. 3.
Figure 4B:
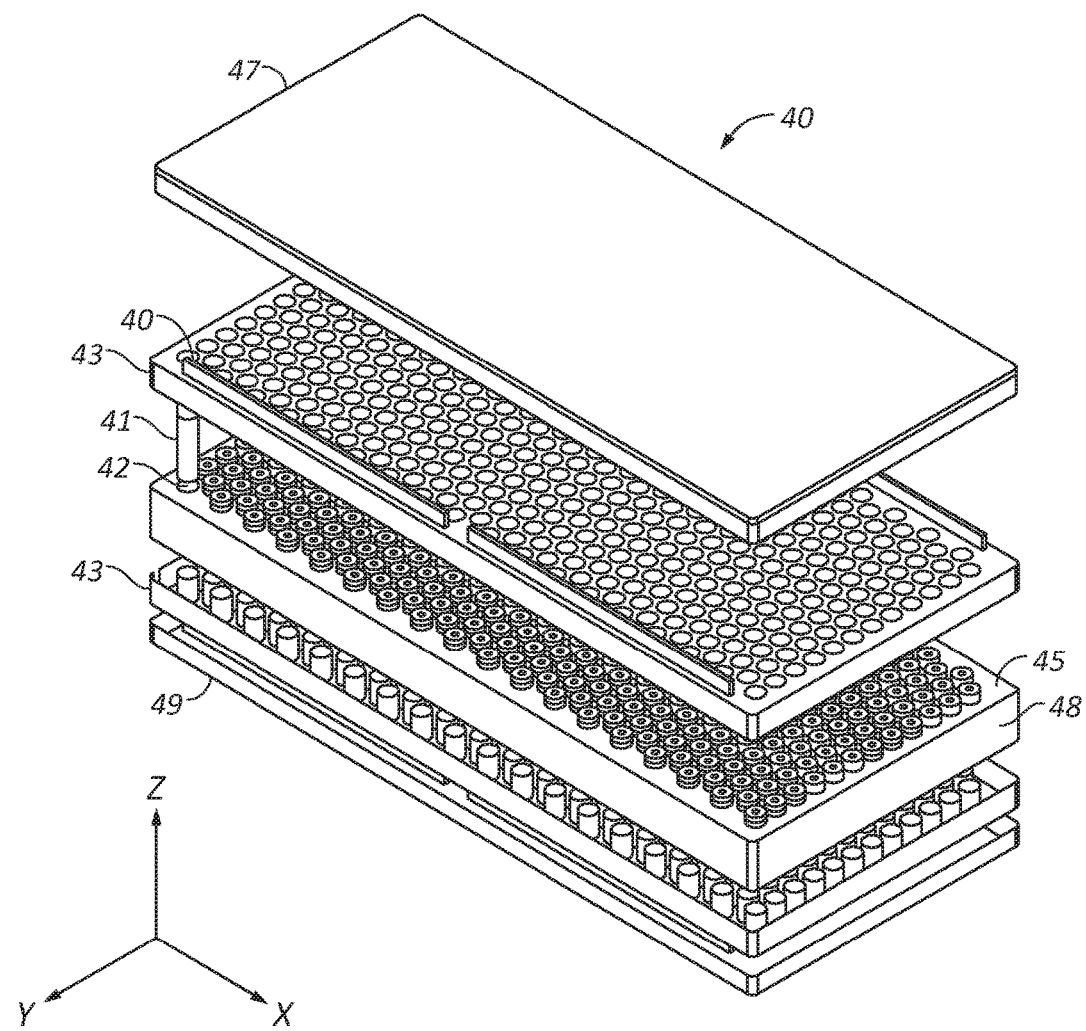
FIG. 4B shows an exploded view of the embodiment of FIG. 4A.

FIGS. 4A and 4B shows an example implementation of a battery module according to the concept of FIG. 3. In particular, FIG. 4A shows a normal perspective view of the battery module 40, while FIG. 4B shows an exploded view of the battery module 40. In certain embodiments, as described herein, the coolant tank is made of a metal, such as aluminum, and coated with one or more layer or layers of an elastomeric coating material, such as silicone rubber. Among other properties, the elastomeric coating material serves as a heat transfer layer between battery cells 41 and the coolant fluid, provides electrical insulation for the battery cells, and provides isolation from fire and/or explosive debris projectiles in the event of a thermal runaway event. It also acts as a sealant (e.g., hermetical sealant) for the cooling tank as well as a shock and vibration absorption material for mounting the cooling tank onto the frame. In some embodiments, the battery cells 41 are conventional, cylindrical, 3400 mAh, 3.7V, rechargeable, Lithium-ion battery cells and have a cross-section diameter of about 18.5 mm and a length of about 65.3 mm. In other embodiments, the cells 41 can be or include energy cells of other types, sizes and/or shapes.

In the illustrated embodiment, the coolant tank is defined collectively by four tank side walls 48, an upper tank cover 45, a lower tank cover 44 (not shown in FIGS. 4A and 4B; opposite the upper tank cover), and battery shields (shells) 42, all of which may be initially formed as separate parts and then bonded together (e.g., by welding, brazing, or any other suitable bonding process). These parts are preferably made of a rigid material, such as aluminum. During assembly, the entire coolant tank is coated with the elastomeric coating 43 (e.g., silicone rubber), including the hollow interiors of the battery shields 42. In some embodiments the elastomeric coating 43 has the following properties/functions: 1) heat conduction between the cooling fluid and battery cells; 2) electrical insulation of battery cells (excluding their designated terminals); 3) ablation (does not burn) and acting as a fire wall; 4) fire retardation from inside content and from outside environment; 5) sealant to prevent humidity and water from going in or out; and 6) shock and vibration resistance in a moving vehicle.

The coating application process can be accomplished by injection molding, for example. A battery cell 41 is then placed in each of the coated shields 42. The coated tank and battery cells 41 are then immersed in a coolant fluid.

The top cap 47 and bottom cap 49 define the top and bottom of the battery module 40, respectively. To strengthen the top of the battery module 40, over which the bulk of the vehicle chassis and the driver will be located, the top cap 47 can be reinforced with, for example, a layer of silicone rubber. On the other hand, to structurally compromise the battery module during a fire or explosion at the bottom, the bottom cap 49 can be reinforced with a layer of silicone rubber material that is thinner than that of the top cap 47. The coolant inlet and outlet (not shown in FIGS. 4A and 4B) are built into the tank side wall 48.

Instead of or in addition to the bottom being thinner, to control the manner of failure in the event of explosion, the bottom cover 44 and bottom cap 49 can have stress concentration points or lines, for example, in the form of v-notch lines. Prior to the moment of explosion, the coolant tank is under pressure. The lower tank cover 44 and bottom cap 49 with stress points/lines will collapse before the upper tank cover 45 and top cap 47 in the event of an explosion, ejecting the tank content through the bottom.

Another advantage of the coolant tank design introduced here over the conventional cooling tube design is that the tank cools the battery cells in batch, whereas the cooling tube cools the battery cells sequentially. In the cooling tube design, the first battery cell gets the coolant first while the last battery gets the coolant last, and the coolant may have become hot by the time it reaches the battery cells near the end of the coolant tube. Hence, there is a temperature differential between the entry coolant and exit coolant. In the coolant tank design the distance between the first row of batteries and last row of batteries is only the width or length of the tank, whereas in the coolant tube design the distance between the first battery cell and the last one is the total length of the coolant tube. The coolant tank design allows the coolant to flow from one side to the other as well as from top to bottom, enabling all of the battery cells to be flooded and cooled at the same time, which is advantageous for embodiments that use very high energy density cells that require instantaneous cooling.

Figure 5:
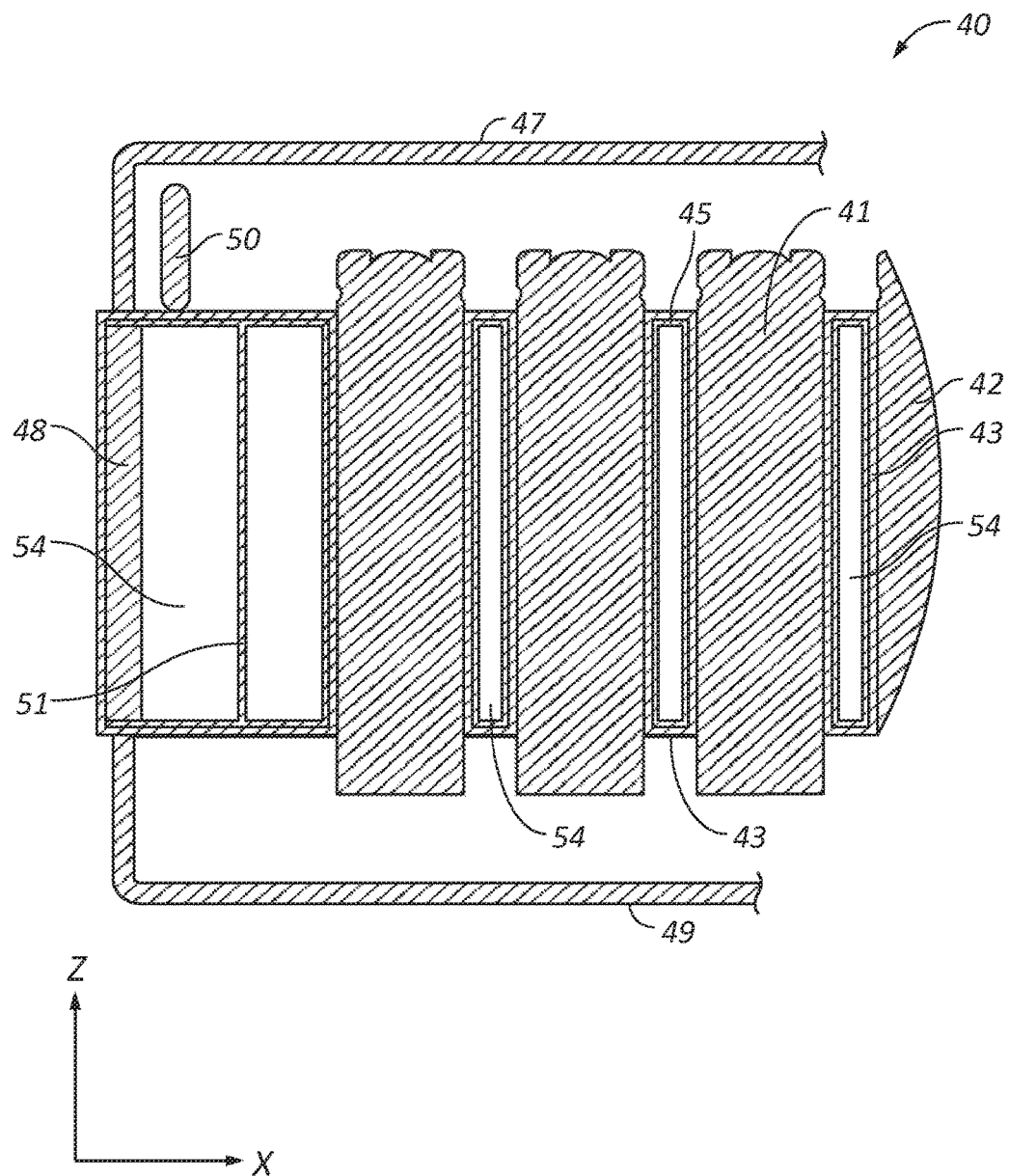
FIG. 5 shows a side cross-sectional view of a portion of a battery module apparatus according to the embodiment of FIGS. 4A and 4B, illustrating the inflow and outflow of coolant, cylindrical battery apparatus surrounded in 360 degrees with coolant for better conductivity and discharge of heat from the battery apparatus to the ambient through the coolant.

FIG. 5 shows a side cross-sectional view (x-z plane) of a portion of the battery module 40 of FIGS. 4A and 4B. Each battery cell 41 is contained within a metal shield 42 (which is part of the coolant tank) that is coated with coating 43 (e.g., silicone rubber) conforming to the shape of the battery cell 41. The shields 42 conform to the shape of the batteries 41. The diameter of the shields 42 and thickness of the coating 43 are such that that each battery cell 41 fits snugly within its coated shield 42 in direct physical contact with the coating 43. In some embodiments, a battery cell 41 is cylindrical. In other embodiments, a battery cell 41 can be rectangular or some other shape.

Each shield 42 is cooled by a coolant fluid (which can be water-based or silicone oil based, for example) that completely surrounds the shield 42 in the x-y plane (as better shown in FIG. 6), for at least a portion of the cell's length along the z axis. In some embodiments, the coolant completely surrounds each shield 42 through the shield's entire length along the z axis (the long axis of the cell). Within the tank, the coolant flows through the gaps between the shields 42. This approach enables each battery cell 41 to operate at its optimal temperature.

The coating 43 acts as a heat transfer medium, yet can also act as electrical insulation for the battery cell and as a fire retardant layer. If a defective cell experiences thermal runaway, the coating 43 acts as a firewall, the presence of which provides time for a temperature sensor (not shown) in the battery module 40 to provide a warning to the vehicle driver.

In one embodiment of the apparatus, represented in FIG. 5, in the event a defective cell explodes or burns, the coolant fluid 54 will rush from all sides (all 360 degrees) to prevent the event from propagating to neighboring battery cells. In some embodiments, if a number of battery cells fail, catch fire or explode, the relatively thinner coolant tank covers 45 are designed to be collapsible. In some embodiments, the top cap 47 and side walls 48 of the coolant tank have thicker material (e.g., both metal and coating 43) than the bottom cap 49. In some embodiments, the top cap 47 and side walls 48 are covered by a relatively thicker ablative silicone rubber surface layer as compared to the bottom cap 9. This construction protects the battery module 40 from fires from neighboring modules and allows the bottom cap 49 of the battery module 40 to collapse first in the event of an explosion.

In some embodiments, as shown in FIGS. 4B and 5, cartridges 10 containing fire extinguishing elements, such as carbon dioxide or halon gas or sodium bicarbonate powder, are stored in the top cap 47. In some embodiments, for example, the sodium bicarbonate powder cartridge is designed to collapse and open, to allow the powder to decompose into carbon dioxide. Halon or carbon dioxide can work in a similar manner. In certain embodiments where this built-in fire extinguishing element is absent, the bottom of the coolant tank and bottom cap 49 will collapse (due to relatively thinner material or designed in stress lines or points), letting the contents, particles, and splinters drop in a direction away from the driver.

In some embodiments, to keep the battery module 40 from crumpling under a collision from the front or back, the battery module 40 is placed in the middle of the car body, below the driver. If a vehicle collision does occur, the battery module 40 can collapse with the bottom cap 49 open to let out its content as the thicker silicone rubber on the top cover and wall retard and resist both the fire and explosion. The collapsed bottom coolant tank cover and bottom end cap 49 allow the fire and contents to drop down and away from the driver or passengers sitting above the battery module 40.

Figure 6:
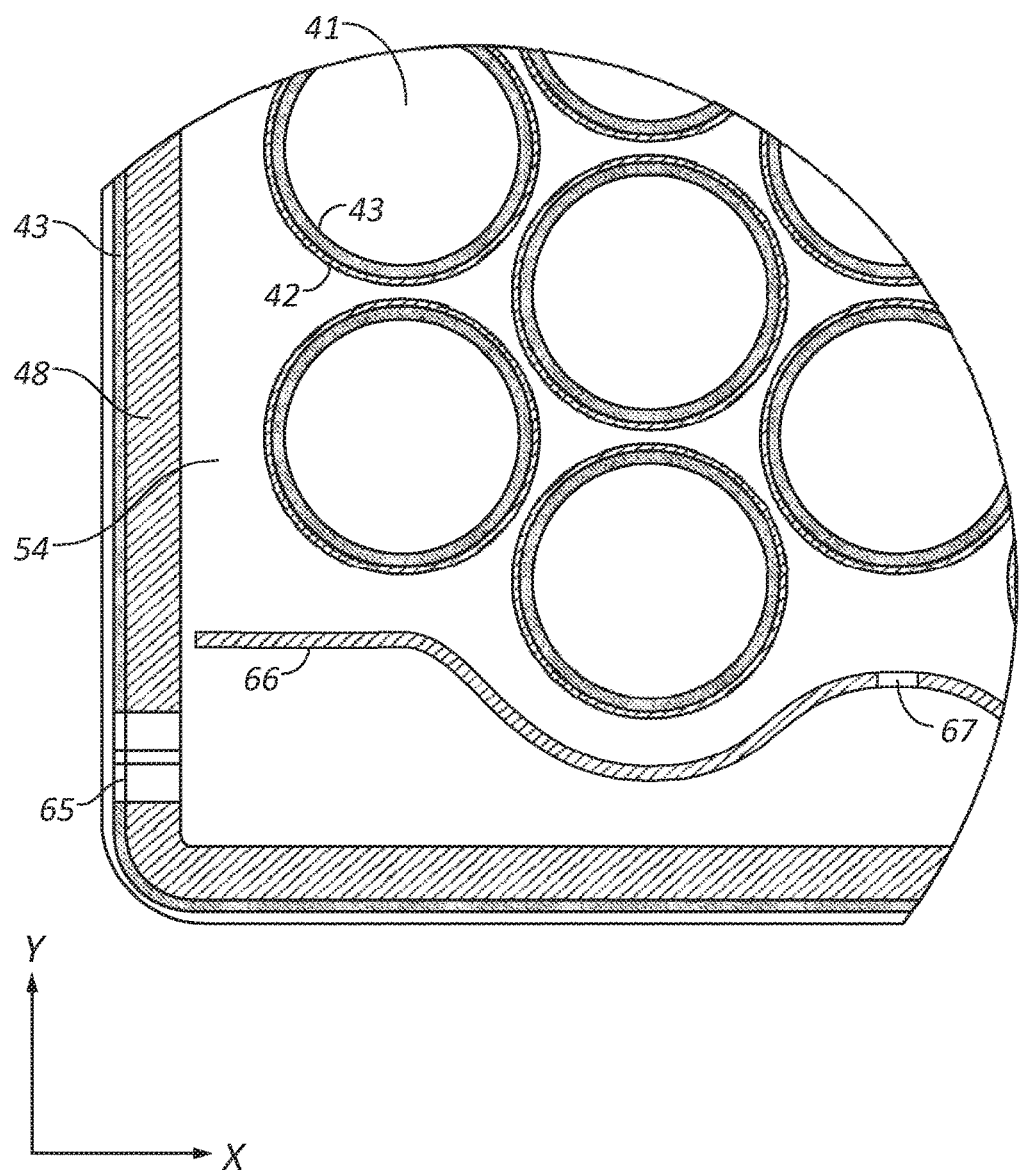
FIG. 6 shows a top cross-sectional view of a battery module apparatus according to the embodiment of FIGS. 4 and 5.

FIG. 6 illustrates a top cross-section view (x-y plane) of a portion of the battery module 40. The battery cells 41 within metal shields 42 and coating 43 are shown with circular base of a cylinder immersed in the coolant tank. The tank side wall 48 presents an inlet 65 for the coolant fluid 54. A baffle plate 66 isolates the effect of movement of the vehicle in various directions to the battery module 40. The baffle plate 66 partially isolates the shells 42 from the inflow but includes holes 67 interspersed at various locations along its length to enable regulated flow of coolant fluid from the inlet 64 (see FIG. 7) to the spaces between the shells 42. A similar baffle plate (not shown) is also provided on the opposite side of the coolant tank to regulate the flow of coolant fluid 54 from the spaces between the shells 42 to the outflow 65.

Multiple battery cells 41 are immersed in coolant fluid 54 (though they are not in direct physical contact with the coolant fluid 54), and consequently, the effect of any failure of a battery cell 41 tends to be localized instead of causing a chain reaction. If multiple failures or fire and/or explosion occur, the tank structure provides for bottom side compromise to protect the driver and most of the vehicle cabin and chassis.

Figure 7:
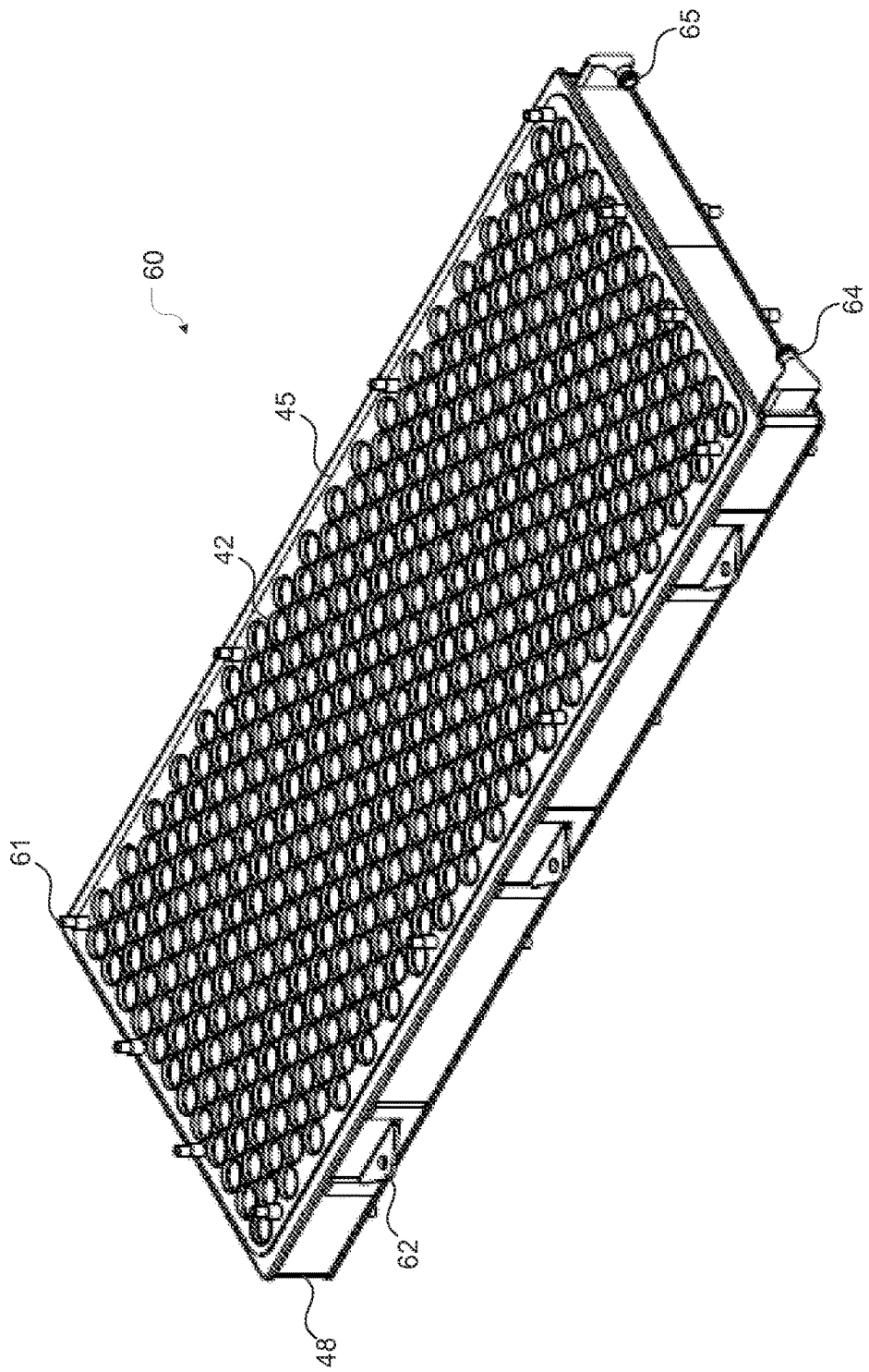
FIG. 7 illustrates a perspective view of the coolant tank.

FIG. 7 illustrates a perspective view of the coolant tank, according to certain embodiments. Built into one of the side walls 48, the coolant tank 60 has an inlet 64 and an outlet 65 to allow inflow of coolant to and outflow of coolant from the tank, respectively. The coolant tank 60 also includes a number of spacer posts 61 around its periphery, protruding beyond the top cover 45 and bottom cover 44 of the coolant tank 60. The spacer posts 61 provide room for the electrical contact boards (not shown in FIG. 7; discussed below) to be mounted between top cover 45 and top cap 47, and between the bottom cover 44 and bottom cap 49. A number of brackets 62 are mounted on the longer side walls 48 to enable the completed battery module 43 mounted to the vehicle.

Figure 8:
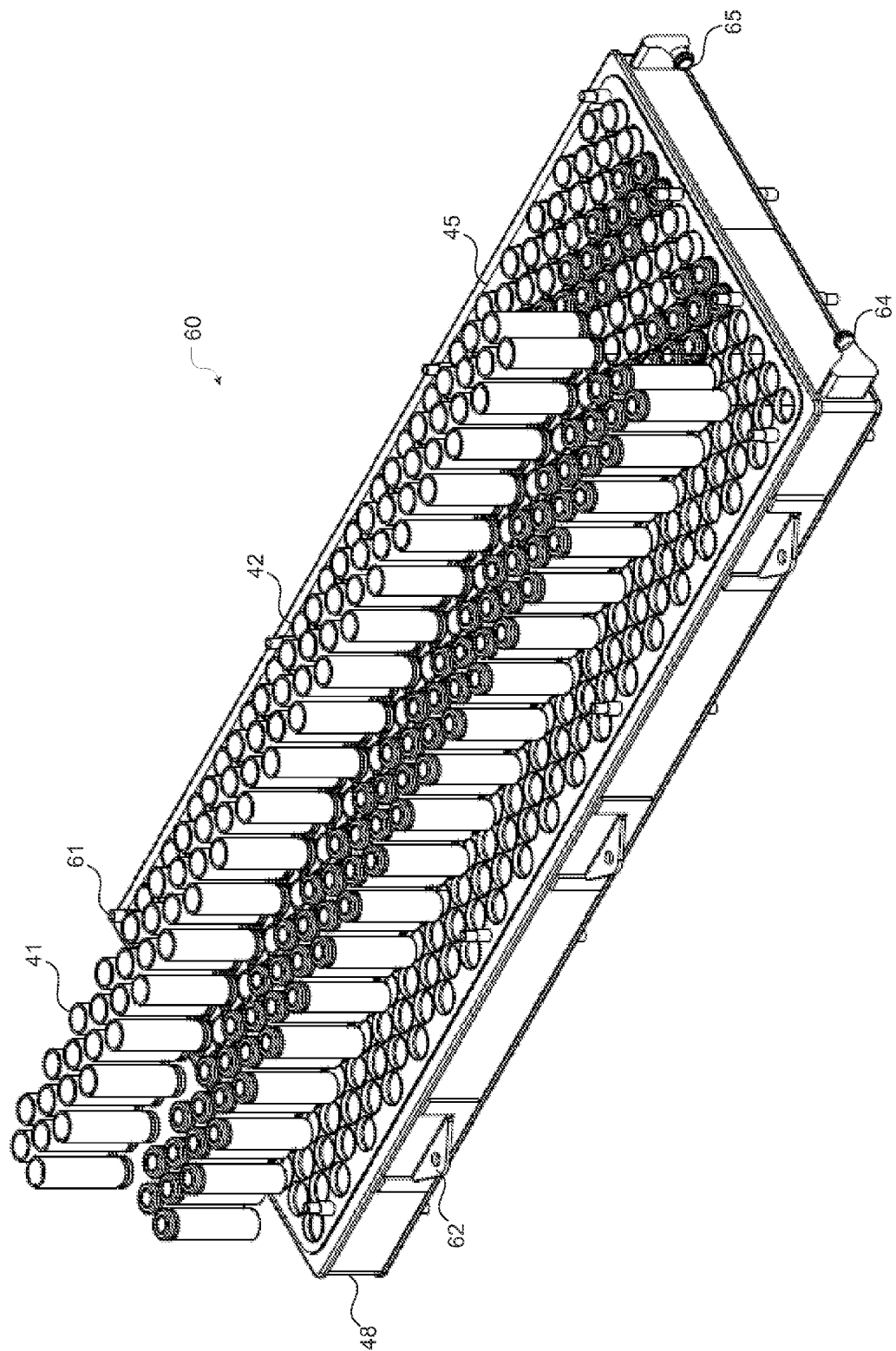
FIG. 8 illustrates a perspective view of the coolant tank, showing how the batteries can be installed in it.
Figure 9:
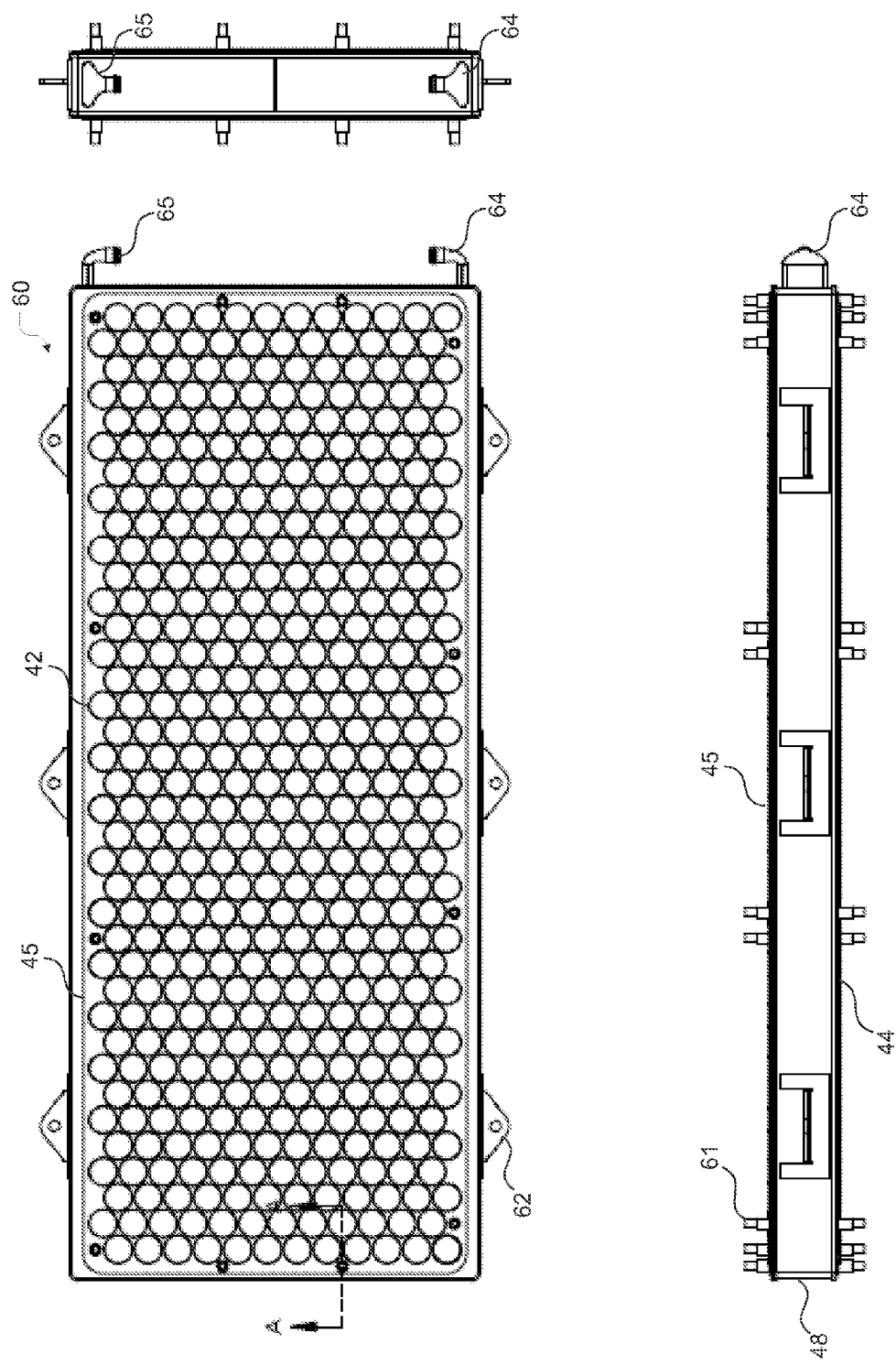
FIG. 9 illustrates orthogonal top, front and side views of the coolant tank.

FIG. 8 illustrates another perspective view of the coolant tank 60, showing how the batteries 41 can be installed in it. Some of the batteries 41 are shown already inserted into their shells 42, while others are shown suspended above their respective shells. FIG. 9 illustrates orthogonal top, front and side views of the coolant tank 60.

Figure 10:
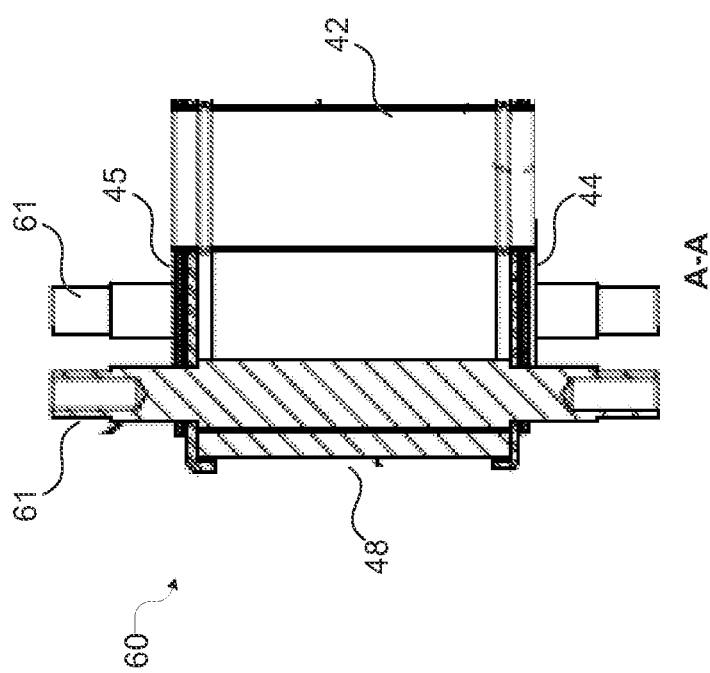
FIG. 10 illustrates a partial cross-sectional view of the coolant tank.

FIG. 10 illustrates a cross-sectional view A-A of the coolant tank 60, where the sectional plane is indicated in FIG. 9. Each of the spacer posts 61 includes a screw hole at its top and bottom end to allow the top cap 47 and bottom cap 49 to be secured to the coolant tank 60. Note that to simplify illustration, the elastomeric coating 43 is not shown in FIGS. 10 through 12B.

Figure 11:
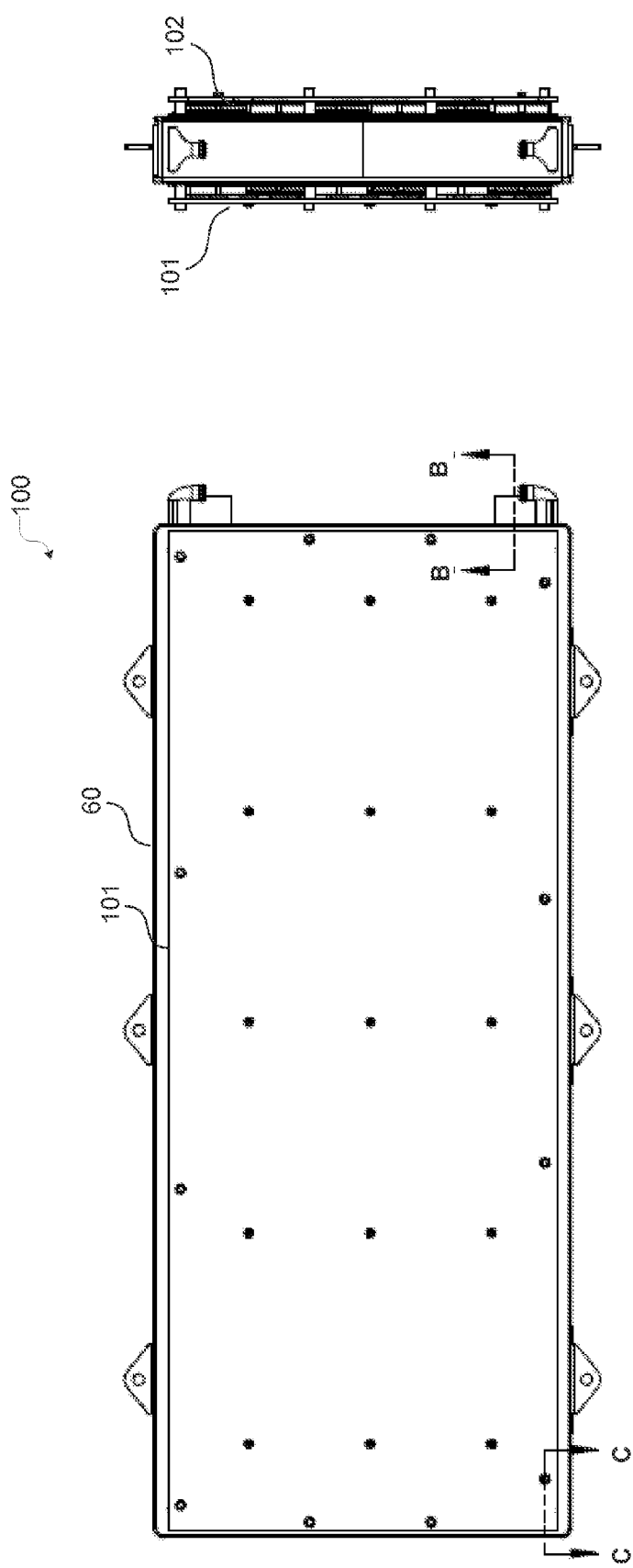
FIG. 11 illustrates orthogonal top and side views of the coolant tank and circuit board assembly.

In certain embodiments, circuit boards are mounted to the top and bottom surfaces of the coolant tank 60, in electrical contact with the batteries 41. FIG. 11 illustrates an example of such an embodiment, with orthogonal top and side views. The tank and circuit board assembly 100 includes a top circuit board 101 and the bottom circuit board 12 mounted to the top and bottoms of the coolant tank 60, respectively. In certain embodiments, circuit boards 101 and 102 do not make direct physical contact with the batteries; instead, inner top and bottom circuit boards 111 and 112, respectively, make contact with the batteries and convey, as illustrated in sectional views of FIGS. 12A (section C-C) and 12B (section D-D). Inner circuit boards 111 and 112 have metal leads 121 and 122, respectively, to make physical contact with the top and bottom electrical terminals of the batteries 41. Circuit boards 101 and 102 are mounted on top of, and in electrical contact with, circuit boards 111 and 112, respectively, to convey current from or to an external connector (not shown) that provides power from the battery module to the vehicle.

Figure 12B:
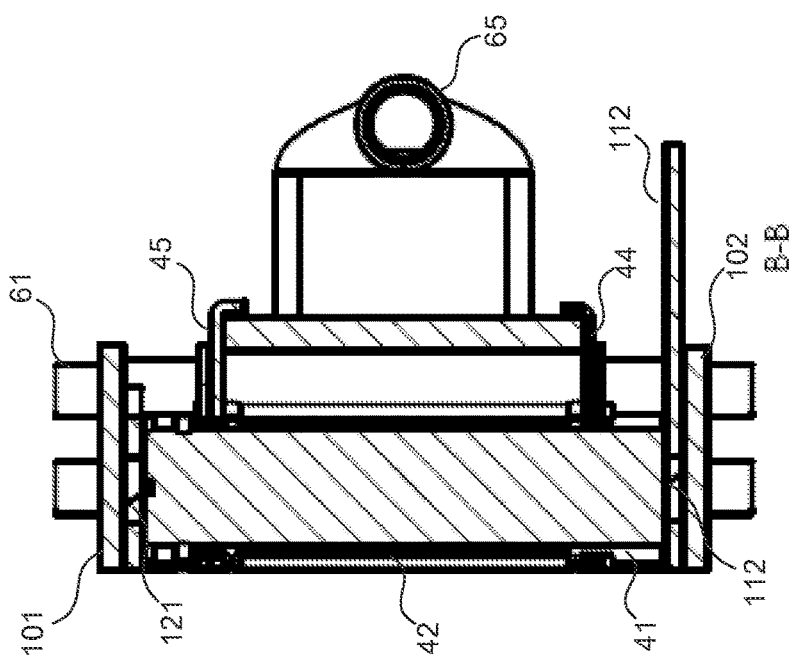
FIGS. 12A and 12B illustrates partial cross sectional views of the coolant tank and circuit board assembly, without the ablative, elastomeric coating.
Figure 12A:
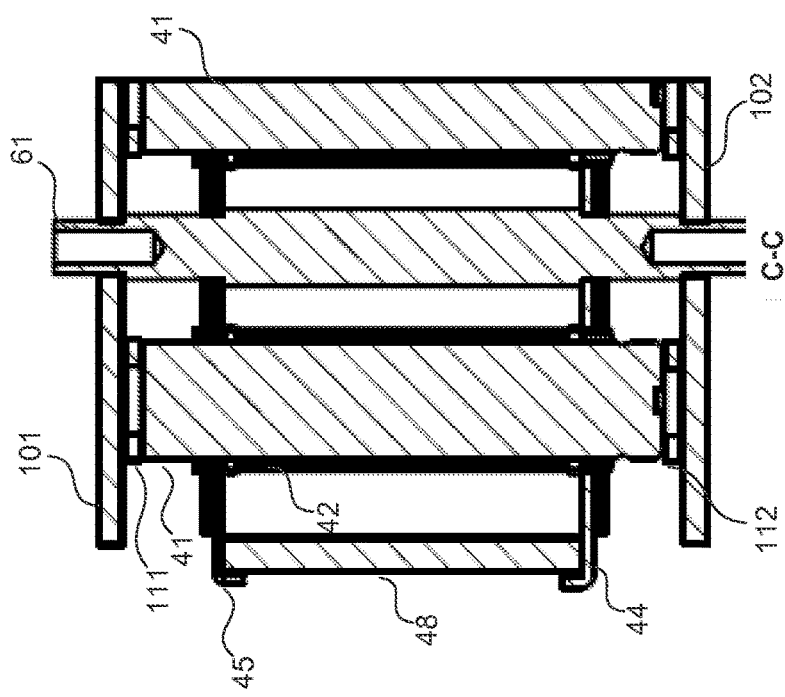
Figure 13:
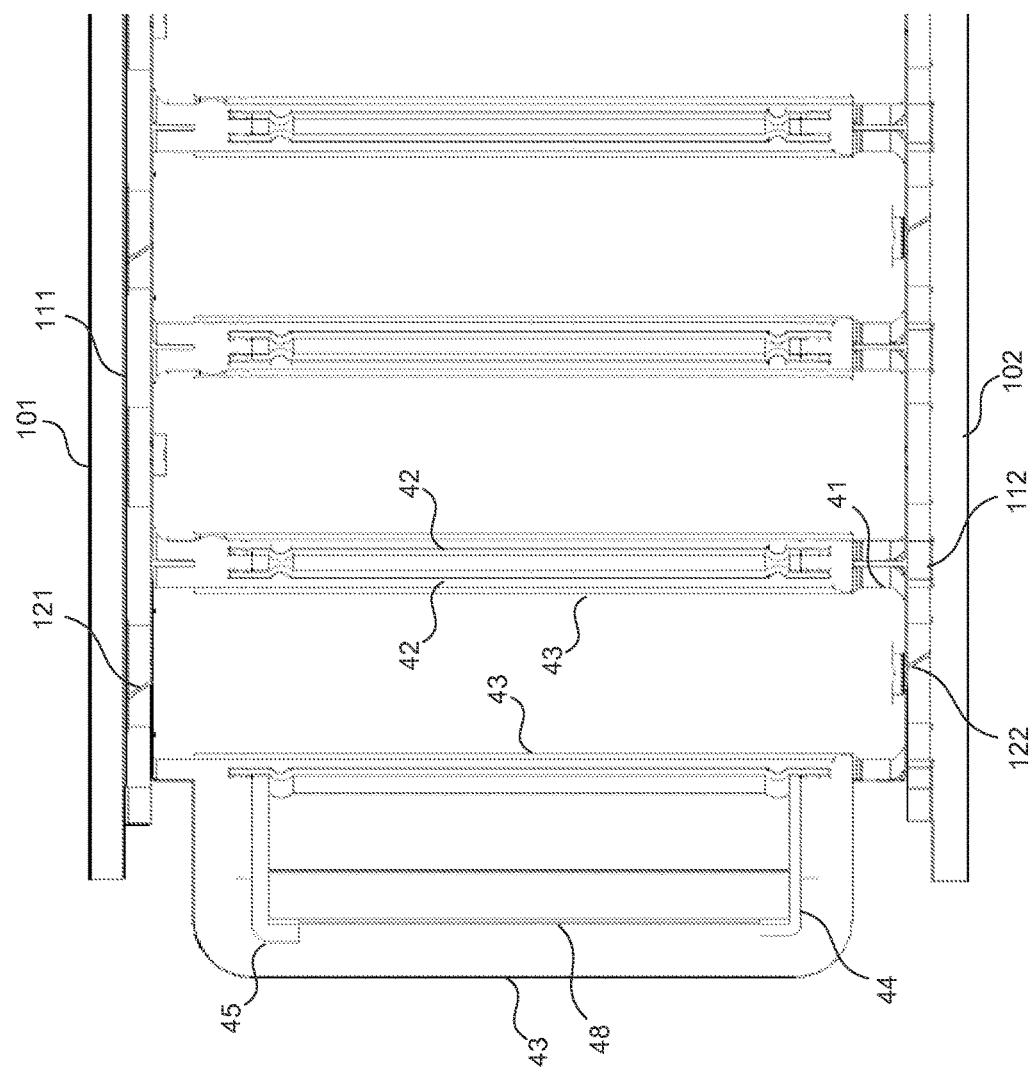
FIG. 13 illustrates a partial cross sectional view of the coolant tank and circuit board assembly, with an ablative elastomeric coating added.

FIG. 13 illustrates a more detailed sectional view similar to that of FIG. 12A; however, the view of FIG. 13 is taken through a different plane, i.e., one which passes through the centers of several batteries 41. Additionally, the layer of elastomeric coating 43 is shown in FIG. 13.

Figure 14:
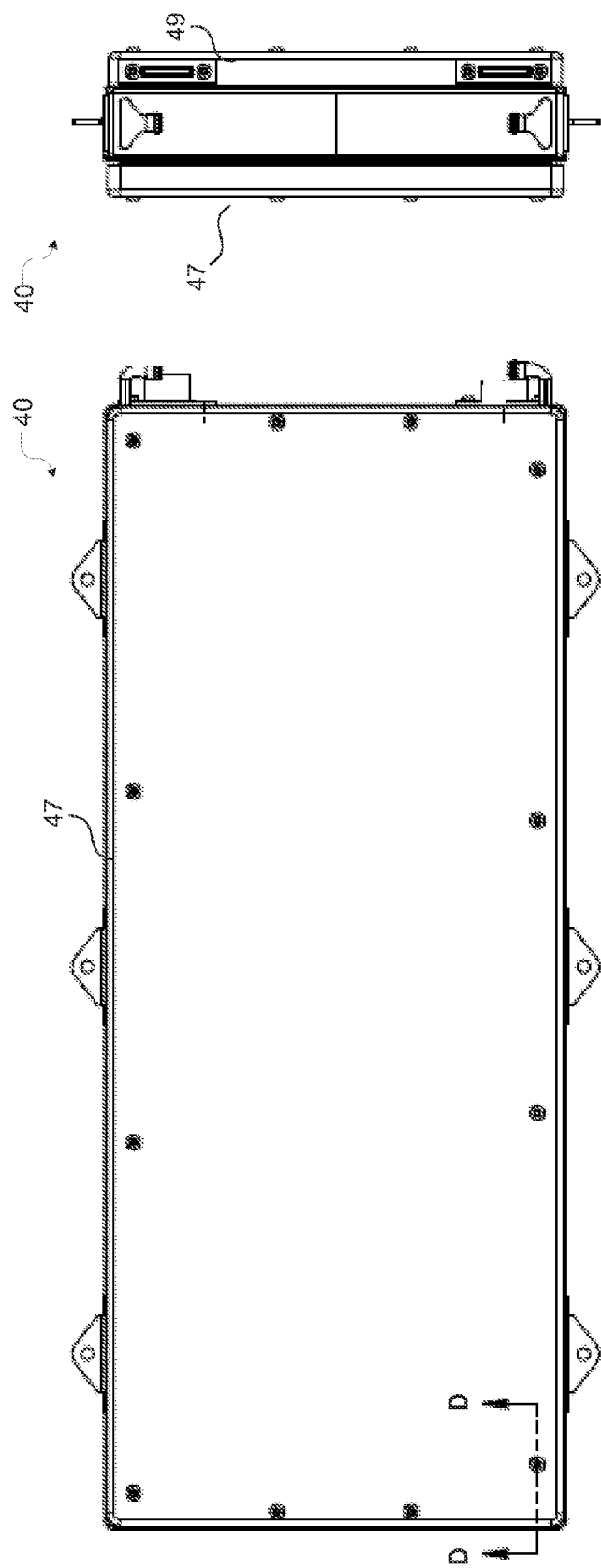
FIG. 14 illustrates orthogonal top and side views of the completed battery module.
Figure 15:
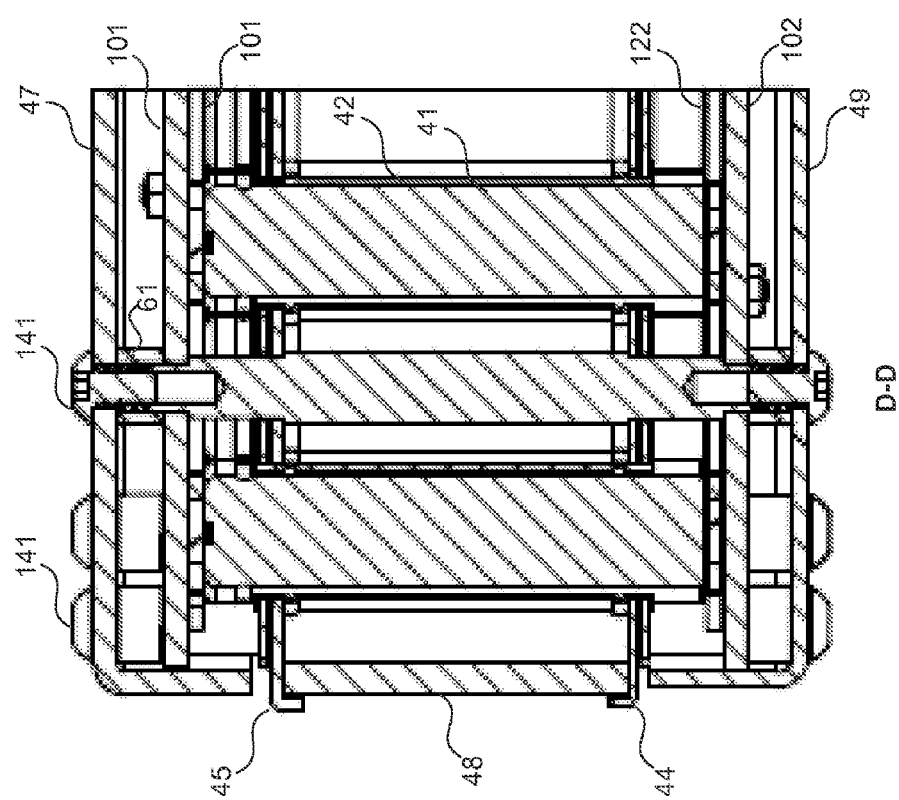
FIG. 15 illustrates a partial cross-sectional view taken through one edge of the complete battery module, without the ablative elastomeric coating.
Figure 16:
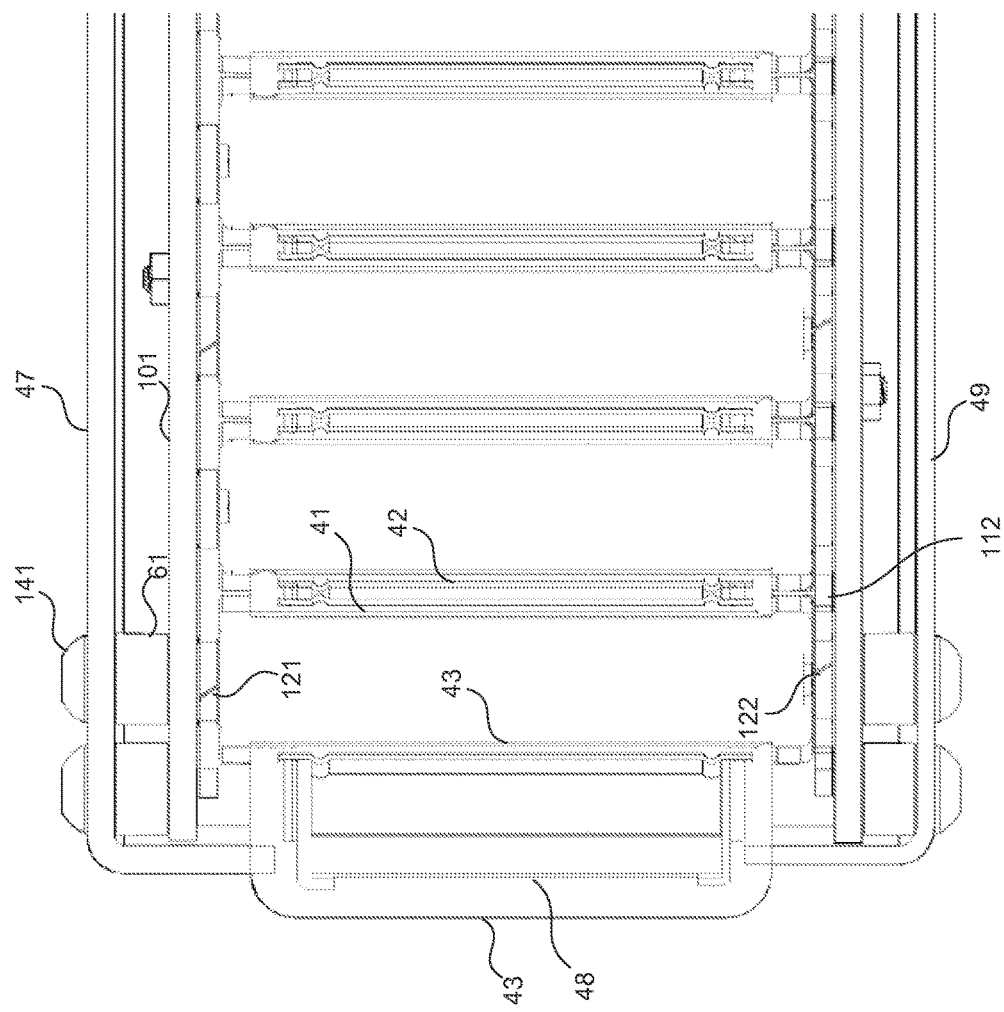
FIG. 16 illustrates a partial cross-sectional view taken through one edge of the complete battery module, with the ablative elastomeric coating added.

FIG. 14 illustrates orthogonal top and side views of the completed battery module 40 according to certain embodiments. The top cap 47 and bottom cap 47 fit over circuit boards 101 and 102, respectively, so that the circuit boards are not exposed. Top cap 47 and bottom cap 49 are secured in place by screws 141 that screw into corresponding holes in the spacer posts 61. FIG. 15 illustrates a sectional view (D-D) taken through one edge of the complete battery module 40. To simplify illustration, the layer of elastomeric coating 43 is not shown in FIG. 15. FIG. 16 illustrates a more detailed sectional view similar to that of FIG. 12A; however, the view of FIG. 16 is taken through a different plane, i.e., one which passes through the centers of several batteries 41. Additionally, the layer of elastomeric coating 43 is shown in FIG. 16.

An example of a process for fabricating the coolant tank will now be described. In this example, the coolant tank is made of aluminum by sheet forming and welding. The battery shields (also called "shells" or "tubes") 42, which also may be aluminum, are formed by extruding and roll forming. Each shield 42 has a small bulge at its ends that serve as stops to position the bottom and top and bottom plates 44 and 45, respectively, of the coolant tank.

In brazing a large number of tubes, a brazing method called "sheet or blanket brazing" herein can be employed. In that technique, a sheet of brazing material ("brazing sheet," i.e., filler and flux), with through holes that have the same diameter and that are in the same pattern as the shields 42, is made. The brazing sheet is then placed on the top and bottom side of the coolant tank. Another thin aluminum sheet acting as the backing sheet is then placed on top of the brazing sheet. A heating plate heated to the required brazing temperature is brought into contact with these top and bottom sheets; this forms a "sandwich" with the coolant tank's top or bottom plate on one side, the aluminum sheet on the other side, and the brazing sheet in the middle. The heating plate melts the brazing material, which then runs to fill the fillets and gaps between the tubes 42 and bottom and top plates 44 and 45, respectively, of the tank. After the tubes 42 are brazed, the assembly is put inside a die, where the silicone rubber coating 43 is molded to cover all of the external surfaces of this assembly. An alternative to the brazing sheet is brazing rings or partial rings attached to the aluminum backing plate. This composite backing plate is then placed on top and bottom side of the tank for brazing by the heating plate.

EXAMPLES

Certain embodiments of the technology introduced herein are summarized in the following numbered examples:

1. A battery module comprising: a plurality of battery cells; and a coolant tank to collect coolant fluid, the coolant tank including a plurality of rigid shells, each of the battery cells being disposed within in a separate one of the shells, wherein the coolant fluid completely surrounds each battery cell in a plane perpendicular to an axis of the battery cell when the coolant fluid is present within the coolant tank.

2. A battery module as recited in example 1, wherein the axis is a long axis of the battery cell.

3. A battery module as recited in example 1 or 2, wherein each of the shells has a shape conforming to a shape of the battery cells.

4. A battery module as recited in any of examples 1 through 3, wherein the battery cells and the shells are cylindrical.

5. A battery module as recited in any of examples 1 through 4, configured such that the coolant fluid, when present within the coolant tank, flows within gaps between the shells.

6. A battery module as recited in any of examples 1 through 5, wherein each of the shells has a hollow portion to accommodate a corresponding one of the battery cells, and wherein a surface of the hollow portion of each of the shells forms a portion of an exterior surface of the coolant tank, such that the coolant fluid does not directly contact the battery cells when the coolant fluid is present within the coolant tank.

7. A battery module as recited in any of examples 1 through 6, further comprising an elastomeric coating disposed on surfaces of the shells, such that within each shell a corresponding battery cell is in physical contact with the elastomeric coating.

8. A battery module as recited any of examples 1 through 7, wherein the elastomeric coating comprises silicone rubber.

9. A battery module as recited in any of examples 1 through 8, the elastomeric coating having been disposed on surfaces of the coolant tank by an injection molding process.

10. A battery module as recited in any of examples 1 through 9, wherein the coolant tank further comprises: an inlet through which the coolant fluid can enter the coolant tank from a first coolant conduit of a battery coolant circulation system; and an outlet through which the coolant fluid can exit the coolant tank to a second coolant conduit of the battery coolant circulation system.

11. A battery module as recited in any of examples 1 through 10, further comprising a top cap disposed to cover a top of the coolant tank, the top cap having a first thickness; and a bottom cap disposed to cover a bottom of the coolant tank, the bottom cap having a second thickness smaller than the first thickness.

12. A battery module as recited in any of examples 1 through 11, wherein the top cap and bottom cap are each coated with an elastomeric coating, and wherein the top cap is coated with a first thickness of the elastomeric coating and the bottom cap is coated with a second thickness of the elastomeric coating, and wherein the second thickness of the elastomeric coating is smaller than the first thickness of the elastomeric coating.

13. A battery module as recited in any of examples 1 through 12, further comprising a cartridge containing a fire retardant material.

14. A battery module comprising: a plurality of battery cells; and a coolant tank to collect coolant fluid for conveying heat away from the battery cells, the coolant tank including a plurality of shells that define a plurality of hollow channels through the coolant tank between a first external surface of the coolant tank and a second external surface of the coolant tank, each of the shells having an interior surface that accommodates one of the battery cells and that forms an exterior surface of the coolant tank, each of the shells being disposed to convey heat from a corresponding one of the battery cells to the coolant fluid within the coolant tank.

15. A battery module as recited in example 14, wherein the coolant fluid completely surrounds each battery cell in a plane perpendicular to an axis of the battery cell when the coolant fluid is present within the coolant tank.

16. A battery module as recited in example 14 or 15, wherein the axis is a long axis of the battery cell.

17. A battery module as recited in any of examples 14 through 16, wherein the battery cells and the shells are cylindrical.

18. A battery module as recited in any of examples 14 through 17, configured such that the coolant fluid, when present within the coolant tank, flows within gaps between the shells.

19. A battery module as recited in any of examples 14 through 18, further comprising an elastomeric coating disposed on surfaces of the shells, such that within each shell a corresponding battery cell is in physical contact with the elastomeric coating.

20. A battery module as recited in any of examples 14 through 19, wherein the elastomeric coating comprises silicone rubber.

21. A battery module as recited in any of examples 14 through 20, the elastomeric coating having been disposed on surfaces of the coolant tank by an injection molding process.

22. A battery module as recited in any of examples 14 through 21, wherein the coolant tank further comprises: an inlet through which the coolant fluid can enter the coolant tank from a first coolant conduit of a battery coolant circulation system; and an outlet through which the coolant fluid can exit the coolant tank to a second coolant conduit of the battery coolant circulation system.

23. A battery module as recited in any of examples 14 through 22, further comprising: a top cap disposed to cover a top of the coolant tank, the top cap having a first thickness; and a bottom cap disposed to cover a bottom of the coolant tank, the bottom cap having a second thickness smaller than the first thickness.

24. A battery module as recited in any of examples 14 through 23, wherein the top cap and bottom cap are each coated with an elastomeric coating, and wherein the top cap is coated with a first thickness of the elastomeric coating and the bottom cap is coated with a second thickness of the elastomeric coating, and wherein the second thickness of the elastomeric coating is smaller than the first thickness of the elastomeric coating.

25. A battery module as recited in any of examples 14 through 24, further comprising a cartridge containing a fire retardant material.

26. A battery module for use in a vehicle when connected to a battery coolant circulation system in the vehicle, the battery module comprising: a plurality of battery cells; a coolant tank to collect coolant fluid to transfer heat away from the battery cells, the coolant tank including a plurality of rigid shells fixedly arranged with gaps therebetween, each of the shells having a hollow portion to accommodate a corresponding one of the battery cells, wherein a surface of the hollow portion of each of the shells forms a portion of an exterior surface of the coolant tank, such that the coolant fluid does not directly contact the battery cells when the coolant fluid is present within the coolant tank; a coating of elastomeric material disposed on surfaces of the shells; wherein within each shell a corresponding one of the battery cells is held in physical contact with the elastomeric material, and wherein the coolant fluid, when present within the coolant tank, flows within the gaps between the shells so as to completely surround each of the shells in a plane perpendicular to long axes of the battery cells; an inlet through which the coolant fluid can enter the coolant tank from a first coolant conduit of the battery coolant circulation system; and an outlet through which the coolant fluid can exit the coolant tank to a second coolant conduit of the battery coolant circulation system; a top cap disposed to cover a top of the coolant tank, the top cap having a first thickness; and a bottom cap disposed to cover a bottom of the coolant tank, the bottom cap having a second thickness smaller than the first thickness.

27. A battery module as recited in example 26, wherein the top cap and bottom cap are each coated with the elastomeric material, and wherein the top cap is coated with a first thickness of the elastomeric coating and the bottom cap is coated with a second thickness of the elastomeric coating, and wherein the second thickness of the elastomeric coating is smaller than the first thickness of the elastomeric coating.

28. A battery module as recited in example 26 or 27, wherein the battery cells and the shells are cylindrical.

29. A battery module as recited in any of examples 26 through 28, wherein the elastomeric coating comprises silicone rubber.

30. A battery module as recited in any of examples 26 through 29, further comprising a cartridge containing a fire retardant material.

31. A battery module as recited in any of examples 1 through 30, wherein the battery module comprises: a top cap of the battery module; a bottom cap of the battery module; an upper tank cover of the coolant tank; and a lower tank cover of the coolant tank; wherein at least one of the bottom cap or the lower tank cover has a designed-in stress concentration feature designed to cause, in the event of an explosion within the coolant tank, a preferential failure of the bottom cap or the lower tank cover instead of or prior to a failure of the top cap and the upper tank cover.

Although the present invention has been explained in relation to its preferred embodiment, it is to be understood that many other possible modifications and variations can be made without departing from the spirit and scope of the invention as herein claimed.

What is claimed is:

1. A battery module for use in a vehicle when connected to a battery coolant circulation system in the vehicle, the battery module comprising:
   a plurality of battery cells, each of the battery cells including a top terminal and a bottom terminal;
   a coolant tank capable of accommodating a coolant fluid to transfer heat away from the battery cells, the coolant tank including
      a plurality of rigid shells fixedly arranged with gaps between adjacent cells, each of the shells having a hollow portion to accommodate a corresponding one of the battery cells, wherein a surface of the hollow portion of each of the shells forms a portion of an exterior surface of the coolant tank, such that the coolant fluid does not directly contact the battery cells when the coolant fluid is present within the coolant tank;
      a coating of elastomeric material disposed on surfaces of the shells;

wherein within each shell a corresponding one of the battery cells is held in physical contact with the elastomeric material, and wherein the coolant fluid, when present within the coolant tank, flows within the gaps between the shells so as to completely surround each of the shells in a plane perpendicular to long axes of the battery cells;

an inlet through which the coolant fluid can enter the coolant tank from a first coolant conduit of the battery coolant circulation system; and an outlet through which the coolant fluid can exit the coolant tank to a second coolant conduit of the battery coolant circulation system;

a top cap forming at least a part of an enclosure to enclose the plurality of battery cells, the top cap having a first thickness; and a bottom cap forming at least a part of the enclosure, the bottom cap having a second thickness smaller than the first thickness.

2. A battery module as recited in claim 1, wherein the top cap and bottom cap are each coated with the elastomeric material, and wherein the top cap is coated with a first thickness of the elastomeric coating and the bottom cap is coated with a second thickness of the elastomeric coating, and wherein the second thickness of the elastomeric coating is smaller than the first thickness of the elastomeric coating.

3. A battery module as recited in claim 1, wherein the battery cells and the shells are cylindrical.

4. A battery module as recited in claim 2, wherein the coolant tank includes a bottom cover, and wherein at least one of the bottom cover or the bottom cap includes a stress concentration feature designed such that any rupture resulting from an explosion of one or more of the battery cells will occur in a predetermined manner.

5. A battery module as recited in claim 1, wherein the coolant tank includes a bottom cover, and wherein at least one of the bottom cover or the bottom cap includes a stress concentration feature designed such that any rupture resulting from an explosion of one or more of the battery cells will occur in a predetermined manner.

* * * * *